Dec. 29, 1959  D. B. PRESCOTT  2,919,127
SHOCK ABSORBER AND PRESSURE SENSITIVE METERING DEVICE THEREFOR
Filed June 16, 1955  2 Sheets-Sheet 1

INVENTOR.
DAVID B. PRESCOTT
BY
ATTORNEY

Dec. 29, 1959   D. B. PRESCOTT   2,919,127
SHOCK ABSORBER AND PRESSURE SENSITIVE METERING DEVICE THEREFOR
Filed June 16, 1955   2 Sheets-Sheet 2

INVENTOR.
DAVID B. PRESCOTT
BY
ATTORNEY

United States Patent Office 2,919,127
Patented Dec. 29, 1959

2,919,127

SHOCK ABSORBER AND PRESSURE SENSITIVE METERING DEVICE THEREFOR

David B. Prescott, Euclid, Ohio, assignor to Cleveland Pneumatic Industries, Inc., a corporation of Ohio Application June 16, 1955, Serial No. 515,840

8 Claims. (Cl. 267—64)

This invention relates generally to shock absorbers and more particularly to a new and improved shock absorber valve mechanism adapted for use in aircraft landing gears.

It is an important object of this invention to provide a new and improved valve mechanism particularly adapted for use in shock absorber units.

It is another important object of this invention to provide a two-stage flow regulation valve for use in shock absorbers wherein the first stage provides a controlled build up of pressure within the shock absorber and the second stage operates to provide a substantially constant maximum pressure in the shock absorber.

It is another important object of this invention to provide a landing gear or strut which incorporates shock absorbing means to assist in the elimination of ground resonant vibration as well as provide a highly efficient impact absorbing mechanism which operates during the landing of the aircraft.

It is another important object of this invention to provide a control valve for use in shock absorbers which prevents overloading of the shock absorber mechanism.

Further objects and advantages will appear from the following description and drawings, wherein.

Conventional aircraft landing gears provide shock absorbing means to cushion the impact of landing. However, in some aircraft installations, additional shock absorption or damping is necessary to prevent the build up of ground resonance vibrations. This is particularly true in helicopters where vibrations set up by rotor rotation have occurred with enough violence to cause severe damage to the ship. A shock absorbing mechanism, according to this invention, provides a simplified structure which meets all of the shock absorbing requirements of a landing gear and is particularly suitable for use on aircraft wherein ground resonant vibration is troublesome.

Figures 1, 2:
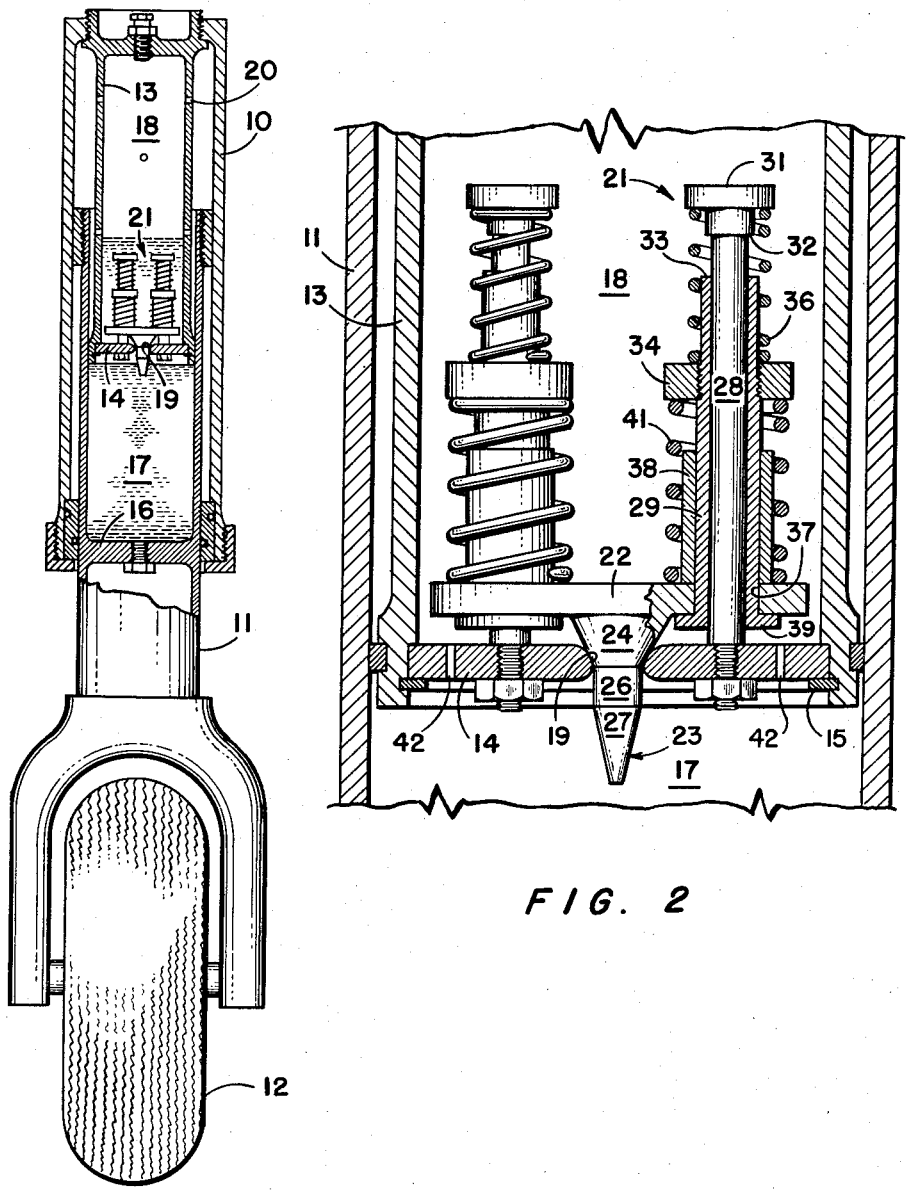
Figure 1 is a side elevation partially in longitudinal section showing the preferred shock absorbing mechanism, according to this invention, installed in an aircraft landing gear.
Figure 2 is an enlarged fragmentary longitudinal section showing the position of the valve elements when the control valve mechanism is in the closed position.

Referring to the drawings, in Figure 1 a landing gear or strut is shown. The strut provides an upper telescoping member 10 and a cooperating lower telescoping member 11. The upper telescoping member 10 is adapted to be fixed to the aircraft and the lower telescoping member 11 is provided with a ground engaging wheel 12. A plunger tube 13 fixed to the upper end of upper telescoping member 10 projects therefrom into the lower telescoping member 11. A separator or orifice plate 14 is mounted on the lower end of the plunger tube 13 by a snap ring 15. A bulkhead 16 formed on the lower telescoping member 11 cooperates with the orifice plate 14 to define therebetween within the lower telescoping member 11 a variable volume liquid filled chamber 17. A second chamber 18, the lower portion of which contains liquid and the upper portion of which is charged with gas under pressure is defined above the orifice plate 14 by the upper telescoping member 10 and the plunger tube 13. It should be understood that the second chamber includes the area between the plunger tube 13 and the upper telescoping member 10 as well as the area within the plunger tube 13. The ports 20 provide communication between these areas. During the impact of landing, a large force is transmitted to the lower telescoping member 11 urging it toward the upper telescoping member 10 creating relative axial motion which reduces the volume of the chamber 17 and increases the pressure of the liquid contained therein.

The orifice plate 14 is formed with a main central orifice 19 which, in cooperation with a control valve mechanism 21, about to be described, controls the flow of liquid from the chamber 17 into the second chamber 18. The flow restriction created by the valve mechanism 21 causes energy to be dissipated when the liquid passes from one chamber to the other and provides the shock absorbing action of the strut.

Figure 3:
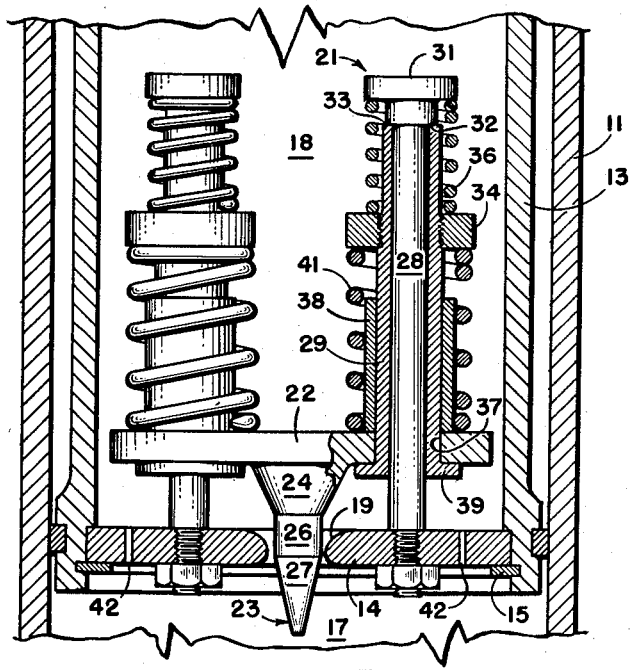
Figure 3 is a fragmentary longitudinal section showing the valve mechanism in the intermediate position.
Figure 4:
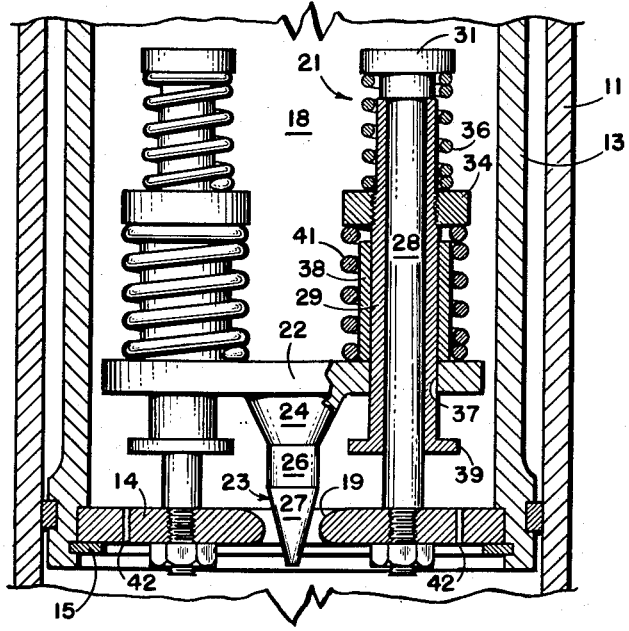
Figure 4 is a fragmentary longitudinal section of the valve mechanism in the regulating position.

Reference should now be made to Figures 2 through 4 wherein the structure and the operation of the control valve mechanism is illustrated. The control valve mechanism 21 provides a valve plate 22 formed with a metering projection or pin 23 which extends through the central orifice 19. The metering pin has a first conical portion 24 adapted to the seat against the rounded wall defining the orifice 19 to close the latter as shown in Figure 2, a second cylindrical portion 26 proportioned to provide a relatively small annular clearance with the wall of the orifice as shown in Figure 3 and a third conical portion 27 adapted to cooperate with the orifice 19 and permit substantial clearance as shown in Figure 4. Fixed to the orifice plate 14 symmetrically around orifice 19, is a plurality of upright pins 28 having their upper ends enlarged to form caps 31 and annular shoulder 32. A spacer sleeve 29 is slidably mounted on each pin 28, with its upper end engageable with pin shoulder 32 for limiting slidable movement in one direction. A collar 34 is threaded on each spacer sleeve 29 and a first spring 36 extends between the cap 31 and the collar 34 resiliently urging the spacer sleeve downwardly toward the orifice plate 14.

The valve plate 22 is formed with a plurality of bores 37 each of which is adapted to closely receive a spacer sleeve 29 and laterally support the valve plate on the spacer sleeves while permitting relative axial motion therebetween. A stop sleeve 38 is positioned around each spacer sleeve 29 between the valve plate 22 and the collar 34 and limits upward axial motion of the valve plate 22 relative to the spacer sleeves 29. The lower ends of the spacer sleeves 29 are formed with a radial shoulder 39 which limits the downward movement of the valve plate 22 relative to the spacer sleeves and a second spring 41 extends between each collar 34 and the valve plate 22 and resiliently urges the valve plate toward engagement with the shoulders 39. The orifice plate 14 is also formed with a plurality of secondary small permanent bypass orifices 42 which permit a small amount of flow between the chambers 17 and 18 when the valve mechanism 21 is closed.

In operation, the second springs 41 resiliently urge the valve plate 22 downwardly relative to the spacer sleeves 29 against the shoulders 39. When the pressure within the chamber is below a first predetermined value the first springs resiliently urge the spacer sleeves and inturn the valve plate 22 downward until the first portion 24 seats against the orifice plate 14 and closes the orifice 19 (see Figure 2). Since the second springs 41 are stronger than the first springs 36 the valve plate 22 will remain against the shoulders 39 when the elements are in this position. If the aircraft is on the ground and ground vibration is created due to the operation of the rotor in the case of a helicopter, a differential pressure is created between the two chambers 17 and 18 due to the forces producing relative axial motion between the upper and lower telescoping members 10 and 11. This causes the liquid to flow from one of the chambers 17 or 18 through the orifices 42 to the other chamber and creates a damping action which resists the ground resonant vibration of the aircraft by absorbing the vibration energy. It should be understood that the pressures developed due to the ground vibration are not great enough to create sufficient forces on the valve plate 22 to move the first portion 24 out of its seated engagement with the orifice plate 14 so any flow between the chambers 17 and 18 must pass through the small orifices 42.

During a landing impact substantially higher pressures are developed in the chamber 17 which are sufficiently large to produce a force reaction on the metering pin 23 which will overcome the biasing force of the first springs 36 and move the valve plate 22 and the spacer sleeves 29 upward until the upper ends 33 engage the stop shoulders 32, as shown in Figure 3. At this time the second portion 26 is within the orifice 19 and a limited amount of liquid can flow through the orifice 19. During the build up of pressure the elements remain in this position because the second springs 41 provide sufficient force to hold the valve plate 22 against the shoulders 39. The biasing force of the first spring 36 is arranged so that the valve mechanism will move to the position as shown in Figure 3 soon after the pressure in the chamber 17 exceeds the pressures which occur during ground vibrations.

As soon as the pressure in the chamber 17 reaches a predetermined value which is substantially the maximum pressure for which the shock absorber is designed, the reaction forces on the metering pin 23 overcome the biasing force of the second springs 41. This causes the valve plate 22 to move upwardly relative to the spacer sleeves 29 against the force of the second springs 41 until the third portion 27 is positioned within the orifice 19. This, of course, increases the flow capacity of the orifice 19.

If the pressure within the chamber 17 continues to go up, the valve plate 22 will move to a higher position thus increasing the effective area of the orifice 19 and if the pressure in the chamber 17 falls below the predetermined pressure, the valve plate 22 will move downwardly increasing the resistance to flow. In effect, in this final stage of valve operation, the valve mechanism operates as a pressure regulator which regulates the pressure within the chamber 17 at substantially the maximum pressure. After the landing impact is absorbed, the further relative axial motion of the lower telescoping member 11 relative to the upper telescoping member 10 stops the pressure within the two chambers 17 and 18 is equalized. At this time the springs 36 and 41 return the valve mechanism to the original position shown in Figure 2 at which time rebound and ground resonant vibration is controlled by the flow through the orifice 42.

It is therefore apparent that when the pressure in the chamber 17 is greater than the pressure in the chamber 18 by a differential pressure less than a first predetermined pressure, the springs 36 hold the valve closed. When the differential pressure exceeds the first predetermined pressure the spacer sleeves 29 move to their upper position and the valve plate 22 is retained in the intermediate position (shown in Figure 3) by the springs 41 until the differential pressure exceeds a second greater predetermined pressure. Then the valve plate 22 moves away from the intermediate position toward its upper position (shown in Figure 4) at which time the pressure differential is regulated at the second predetermined pressure. Of course the valve will only regulate the pressure at the maximum value so long as the flow exceeds a minimum rate and as soon as the flow drops below this rate the pressure will drop.

By utilizing the two stages of valve control, it is possible to produce a shock absorber wherein the pressure within the chamber 17 can build up rapidly in a controlled manner without causing over pressure within the chamber 17. As soon as the desired maximum pressure is reached, the second stage of valving comes into play and controls the maximum pressure within the chamber 17. By properly proportioning the various elements essentially any damping characteristic may be achieved. It is, therefore, apparent to those skilled in the art that a shock absorber mechanism, according to this invention meets all the requirements of aircraft use since it provides adequate ground resonant vibration damping as well as the impact damping forces necessary in landings. Also because the valve mechanism is structurally simple, the initial cost of manufacture is low and maintenance costs are negligible.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A shock absorbing strut comprising first and second relatively movable telescoping members, an orifice plate on one of said members, first and second fluid containing chambers separated by said plate, said plate being formed with an orifice providing a flow path between said chambers, a unitary valve element movable relative to said orifice plate between a first and second position, said valve element being formed with means to prevent flow through said orifice when said valve member is in said first position and permit substantial flow therethrough as it approaches said second position, first resilient means maintaining said valve element in said first position when the difference in pressure between said first chamber and said second chamber is less than a first predetermined differential pressure and becoming inoperative when said difference in pressure is greater than said first differential pressure, and second resilient means biasing said valve element toward said first position and permitting motion thereof toward said second position when said difference in pressure exceeds a second greater predetermined differential pressure.

2. A shock absorbing strut comprising first and second relatively movable telescoping members, an orifice plate on one of said members, first and second fluid containing chambers separated by said plate, said plate being formed with an orifice providing a flow path between said chambers, a unitary valve element movable relative to said orifice plate between a first and second position, said valve element being formed with means to prevent flow through said orifice when said valve element is in said first position and permit substantial flow therethrough when it is in said second position, first resilient means maintaining said valve element in said first position when the difference in pressure between said first chamber and said second chamber is less than a predetermined amount and permitting said valve element to move to an intermediate position between said first and second positions when said difference in pressure is greater than said predetermined amount, and second resilient means biasing said valve element toward said intermediate position and permitting motion thereof toward said second position when said difference in pressure exceeds a second greater predetermined amount.

3. A shock absorbing strut comprising first and second relatively movable telescoping members, an orifice plate on one of said members, first and second fluid containing chambers separated by said plate, said plate being formed with a main orifice and secondary smaller orifices providing flow paths between said chambers, a unitary valve element movable relative to said orifice plate between a first and second position, said unitary valve element being formed with means to prevent flow through said main orifice when said valve element is in said first position and permit substantial flow therethrough when it is in said second position, first control means maintaining said valve element in said first position when the difference in pressure between said first chamber and said second chamber is less than a predetermined amount and becoming inoperative when said difference in pressure is greater than said predetermined amount, and second control means biasing said valve element toward said first position and permitting motion thereof to said second position when said difference in pressure exceeds a second greater predetermined amount, said secondary orifices providing a limited flow connection between said chambers when said valve element prevents flow through said main orifice.

4. A control valve comprising an orifice plate assembly formed with a flow path therethrough, a spacer element mounted on said assembly for motion relative thereto, first stop means limiting motion of said spacer element in one direction, a valve member slidably mounted on said spacer element and movable relative thereto formed with a projection extending into said path adapted to restrict flow therethrough by an amount dependent upon the relative position between said projection and plate, second stop means limiting motion of said valve member relative to said spacer element in a direction opposite to said one direction, first resilient means urging said valve member against said second stop means, and second resilient means substantially weaker than said first resilient means urging said spacer element away from said first stop means.

5. A control valve comprising an orifice plate assembly formed with an orifice therethrough, a spacer element mounted on said assembly for motion relative thereto, first stop means limiting motion of said spacer element in a direction away from said plate assembly, a valve member slidably mounted on said spacer element and movable relative to said assembly between a first and second position, said valve element being formed with a projection extending into said orifice, second stop means limiting motion of said valve member relative to said spacer element in a direction toward said assembly, first resilient means urging said valve member against said second stop means, and second resilient means substantially weaker than said first resilient means urging said spacer element away from said first stop means, said projection being proportioned to prevent flow through said orifice when said valve member is in said first position and permit flow therethrough when it is spaced therefrom.

6. A shock absorbing strut comprising first and second relatively movable telescoping members, an orifice plate mounted on one of said members formed with an orifice, a fluid filled chamber on each side of said orifice plate, a valve element movable relative to said plate between a first and second position, a projection on said valve element extending into said orifice formed with a first portion adapted to seat against and prevent flow through said orifice when said valve element is in said first position, a second portion adapted to cooperate with said orifice and permit limited flow therethrough when said valve element is in an intermediate position between said first and second positions, and a third portion adapted to permit substantial flow through said orifice when said valve element approaches said second position, resilient means retaining said valve element in said first position when the pressure in one of said chambers is below a first predetermined pressure and permitting it to move to said intermediate position when the pressure in said one chamber exceeds said first predetermined pressure, said resilient means retaining said valve element in said intermediate position when the pressure in said one chamber is greater than said first predetermined pressure and less than a second higher predetermined pressure and permitting said valve member to move away from said intermediate position toward said second position when the pressure in said one chamber exceeds said second predetermined pressure.

7. A shock absorbing strut comprising first and second relatively movable telescoping members, an orifice plate mounted on one of said members formed with an orifice, a fluid filled chamber on each side of said orifice plate, a valve element movable relative to said plate between a first and second position, a projection on said valve element extending into said orifice formed with a first portion adapted to seat against and prevent flow through said orifice when said valve element is in said first position, a second portion adapted to cooperate with said orifice and permit limited flow therethrough when said valve element is in an intermediate position between said first and second positions, and a third portion adapted to permit substantial flow through said orifice when said valve element approaches said second position; first resilient means retaining said valve element in said first position when the pressure in one of said chambers is below a first predetermined pressure and permitting it to move to said intermediate position when the pressure in said one chamber exceeds said first predetermined pressure, and second resilient means retaining said valve element in said intermediate position when the pressure in said one chamber is greater than said first predetermined pressure and less than a second higher predetermined pressure and permitting said valve member to move away from said intermediate position toward said second position when the pressure in said one chamber exceeds said second predetermined pressure.

8. A shock absorbing strut comprising first and second relatively movable telescoping members, an orifice plate mounted on one of said members formed with a main orifice and a secondary smaller orifice therethrough, a fluid filled chamber on each side of said orifice plate, a valve element mounted on said plate for motion relative thereto between a first position adjacent to said plate and a second position spaced therefrom; a projection on said valve element extending into said main orifice formed with a first portion adapted to seat against and prevent flow through said main orifice when said valve element is in said first position, a second portion adapted to cooperate with said main orifice and permit limited flow therethrough when said valve element is in an intermediate position between said first and second positions, and a third portion adapted to permit substantial flow through said main orifice when said valve element approaches said second position; first resilient means retaining said valve element in said first position when the pressure in one of said chambers is below a first predetermined pressure and permitting it to move to said intermediate position when the pressure in said one chamber exceeds said first predetermined pressure, and second resilient means retaining said valve element in said intermediate position when the pressure in said one chamber is greater than said first predetermined pressure and less than a second higher predetermined pressure and permitting said valve member to move away from said intermediate position toward said second position when the pressure in said one chamber exceeds said second predetermined pressure.

References Cited in the file of this patent

UNITED STATES PATENTS

| | | |
|---|---|---|
| 1,274,378 | Breitstein | Aug. 6, 1918 |
| 1,670,357 | Hufford et al. | May 22, 1928 |
| 2,570,362 | Mercier | Oct. 9, 1951 |

FOREIGN PATENTS

| | | |
|---|---|---|
| 969,353 | France | May 17, 1950 |